United States Patent
Aimura et al.

(10) Patent No.: US 8,189,868 B2
(45) Date of Patent: May 29, 2012

(54) VEHICLE PERIPHERY MONITORING DEVICE

(75) Inventors: Makoto Aimura, Wako (JP); Nobuharu Nagaoka, Wako (JP); Hideki Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/994,922

(22) PCT Filed: Mar. 4, 2009

(86) PCT No.: PCT/JP2009/000977
§ 371 (c)(1),
(2), (4) Date: Nov. 29, 2010

(87) PCT Pub. No.: WO2009/150771
PCT Pub. Date: Dec. 17, 2009

(65) Prior Publication Data
US 2011/0096956 A1    Apr. 28, 2011

(30) Foreign Application Priority Data
Jun. 12, 2008    (JP) .................................. 2008-154408

(51) Int. Cl.
*G06K 9/00*    (2006.01)
(52) U.S. Cl. ........ 382/103; 382/104; 382/106; 382/107; 382/291; 348/118; 348/142; 348/148; 348/152; 348/169
(58) Field of Classification Search .................. 382/103, 382/104, 106, 107, 286, 291; 348/118, 142, 348/148, 149, 152, 154–155, 169
See application file for complete search history.

(56) References Cited

U.S. PATENT DOCUMENTS
5,475,494 A * 12/1995 Nishida et al. ............... 356/4.01
(Continued)

FOREIGN PATENT DOCUMENTS
DE    103 36 638 A1    2/2005
(Continued)

OTHER PUBLICATIONS
Kehtarnavaz N. et al., "Establishing Collision Zones for Obstacles Moving With Uncertainty", Computer Vision Graphics and Image Processing, Academic Press, vol. 49, No. 1, Jan. 1, 1990, pp. 95-103, Duluth, MA.

*Primary Examiner* — Jayesh A Patel
(74) *Attorney, Agent, or Firm* — Carrier Blackman & Associates, P.C.; Joseph P. Carrier; William D. Blackman

(57) ABSTRACT

A vehicle periphery monitoring device is operable to report a high contact possibility between a vehicle and an object at an appropriate time or frequency according to the type of the object. When the object is determined to be a human being and the position of the object in real space is contained in a first contact determination area, a high contact possibility between the vehicle and the object is reported. On the other hand, when the object is determined to be a quadruped animal and the real spatial position of the object is contained in a second contact determination area, the corresponding report is made. The second contact determination area has an overlapped area that overlaps with the first contact determination area, and an overflowed area that has at least a part thereof overflowing from the first contact determination area.

7 Claims, 6 Drawing Sheets

U.S. PATENT DOCUMENTS

| | | | |
|---|---|---|---|
| 5,530,420 A * | 6/1996 | Tsuchiya et al. | 340/435 |
| 6,169,572 B1 * | 1/2001 | Sogawa | 348/113 |
| 6,327,536 B1 * | 12/2001 | Tsuji et al. | 701/301 |
| 6,445,409 B1 * | 9/2002 | Ito et al. | 348/155 |
| 6,661,449 B1 * | 12/2003 | Sogawa | 348/113 |
| 6,859,144 B2 * | 2/2005 | Newman et al. | 340/576 |
| 6,961,466 B2 * | 11/2005 | Imagawa et al. | 382/190 |
| 7,133,537 B1 * | 11/2006 | Reid | 382/103 |
| 7,275,431 B2 * | 10/2007 | Zimmermann et al. | 73/510 |
| 7,307,655 B1 * | 12/2007 | Okamoto et al. | 348/222.1 |
| 7,447,334 B1 * | 11/2008 | Jiang et al. | 382/103 |
| 7,593,573 B2 * | 9/2009 | Hahn et al. | 382/181 |
| 7,949,151 B2 * | 5/2011 | Taniguchi et al. | 382/104 |
| 8,005,266 B2 * | 8/2011 | Saka et al. | 382/104 |
| 2002/0130953 A1 * | 9/2002 | Riconda et al. | 348/115 |
| 2003/0002712 A1 * | 1/2003 | Steenburgh et al. | 382/103 |
| 2003/0007074 A1 * | 1/2003 | Nagaoka et al. | 348/148 |
| 2003/0044083 A1 * | 3/2003 | Mekata | 382/282 |
| 2005/0157929 A1 * | 7/2005 | Ogasawara | 382/181 |
| 2006/0012681 A1 * | 1/2006 | Fujii | 348/169 |
| 2006/0050929 A1 * | 3/2006 | Rast et al. | 382/103 |
| 2006/0170769 A1 * | 8/2006 | Zhou | 348/143 |
| 2007/0223785 A1 * | 9/2007 | Sano | 382/103 |
| 2008/0019567 A1 * | 1/2008 | Takagi et al. | 382/103 |

FOREIGN PATENT DOCUMENTS

| | | |
|---|---|---|
| DE | 10 2007 015 032 A1 | 1/2008 |
| JP | 2001-006096 A | 1/2001 |
| JP | 2001006096 A * | 12/2001 |
| JP | 2005316607 A * | 10/2005 |
| JP | 2005-316607 A | 11/2005 |
| JP | 2007-323578 A | 12/2007 |
| JP | 2007-334511 A | 12/2007 |
| JP | 2008-135015 A | 6/2008 |
| JP | 2008-276787 A | 11/2008 |
| JP | 2008135015 A * | 12/2008 |

* cited by examiner ized in a plurality of local areas, respectively. When the variations of the luminance in the local areas are greater than a predetermined level, the object area is extracted.

VEHICLE PERIPHERY MONITORING DEVICE

PRIORITY CLAIM

The present application is based on and claims the priority benefit of Japanese Patent Application 2008-154408 filed on Jun. 12, 2008, the contents of which are incorporated herein by reference in its entirety.

BACKGROUND OF THE INVENTION

1. Field of the Invention

The present invention relates to a vehicle periphery monitoring device configured to monitor the periphery of a vehicle through the usage of a captured image acquired by an imaging device mounted in the vehicle.

2. Description of the Related Art

There has been disclosed a vehicle periphery monitoring device which calculates a motion vector of an object in real space such as an animal or the like present in the periphery of a vehicle according to position data in time series of the object, determines the level of the contact possibility between the vehicle and the object according to the motion vector, and reports the high contact possibility to the driver when it is determined that the level of the contact possibility is high (refer to Japanese Patent Laid-open No. 2001-006096).

However, when the object is a quadruped animal such as a deer or the like, it is commonly difficult to predict the motions thereof; therefore, if the level of the contact possibility is determined on the basis of the motion vector, it is possible that the report would be given out to the driver at a delayed time. On the other hand, despite that the object, such as a human being, of which the motions can be predicted relatively easier, simply shortening the time of giving out the report would make the report frequency to the driver become high in vain.

SUMMARY OF THE INVENTION

The present invention has been accomplished in view of the aforementioned problems, and it is therefore an object of the present invention to provide a vehicle periphery monitoring device capable of reporting a high contact possibility between a vehicle and an object at an appropriate time or frequency according to the type of the object.

A first aspect of the present invention provides a vehicle periphery monitoring device configured to monitor the periphery of a vehicle by using a captured image acquired by an imaging device mounted in the vehicle. The vehicle periphery monitoring device of the present invention comprises: an object extraction unit configured to extract an object area corresponding to the object from the captured image; a position determination unit configured to determination the real spatial position of the object corresponding to the object area extracted by the object extraction unit; a contact determination area setting unit configured to set a contact determination area for determining the contact possibility level between the vehicle and the object; an object report unit configured to report the presence of the object to the driver on condition that the real spatial position of the object determined by the position determination unit is contained in the contact determination area set by the contact determination area setting unit; and an object determination unit configured to determine whether the object is either a human being or a quadruped animal on the basis of the object area extracted by the object extraction unit, wherein the contact determination area setting unit sets a first contact determination area when the object is determined by the object determination unit to be a human being, and sets a second contact determination area having an overlapped area that overlaps with the first contact determination area and an overflowed area that has at least a part thereof overflowing from the first contact determination area when the object is determined by the object determination unit to be a quadruped animal.

According to the vehicle periphery monitoring device of the first aspect of the present invention, on condition that the object is determined to be a human being and the real spatial position of the object is determined to be contained in the first contact determination area, the report that the contact possibility between the vehicle and the object is high is given out. On the other hand, on condition that the object is determined to be a quadruped animal and the real spatial position of the object is determined to be contained in the second contact determination area, the report that the contact possibility between the vehicle and the object is high is given out.

The second contact determination area has an overlapped area that overlaps with the first contact determination area and an overflowed area that has at least a part thereof overflowing from the first contact determination area. Therefore, when the object is a quadruped animal, even though the real spatial position thereof is not contained in the first contact determination area, the report would be given out if the real spatial position of the object is contained in the overflowed area of the second contact determination area which overflows from the first contact determination area; therefore, in comparison with the case where the object is a human being, the report can be given out at an earlier time. On the other hand, when the object is a human being, even though the real spatial position thereof is contained in the overflowed area of the second contact determination area which overflows from the first contact determination area, no report would be given out; thereby, the report that the contact possibility between the vehicle and the human being is high can be prevented from being given out at a high frequency in vain. Accordingly, the high contact possibility between the vehicle and the object can be reported at an appropriate time or frequency according to the type of the object.

A second aspect of the present invention is dependent on the first aspect of the present invention and is further provided with a motion vector calculation unit configured to calculate a motion vector of the object on the basis of the real spatial positions of the object determined by the position determination unit at different times, wherein the contact determination area setting unit sets a third contact determination area outside the first contact determination area on condition that the object is determined by the object determination unit to be a human being, the object report unit reports the presence of the human being as the object to the driver on condition that the real spatial position of the object is contained in the third contact determination area and the motion vector of the object calculated by the motion vector calculation unit is pointing toward the first contact determination area, and the contact determination area setting unit sets a combined area of the first contact determination area and a part of or the entire part of the third contact determination area as the second contact determination area on condition that the object is determined by the object determination unit to be a quadruped animal.

According to the vehicle periphery monitoring device of the second aspect of the present invention, the high contact possibility between the vehicle and the object will be reported when the object is determined to be a human being, the real spatial position of the object is contained in the third contact determination area and the motion vector of the object is pointing toward the first contact determination area. Thus, when the real spatial position of the human being is contained in the third contact determination area but the motion vector thereof is not pointing toward the first contact determination area, no report would be given out; thereby, the report that the contact possibility between the vehicle and the human being is high can be prevented from being given out at a high frequency in vain. On the other hand, when the object is determined to be a quadruped animal and the real spatial position thereof is contained in the third contact determination area, namely, a part of the second contact determination area, the report will be given out regardless of the direction of the motion vector thereof; thus, the report can be given out at an earlier time than the case when the object is a human being. Accordingly, the high contact possibility between the vehicle and the object can be reported at an appropriate time or frequency according to the type of the object.

A third aspect of the present invention is dependent on the first aspect of the present invention, wherein the contact determination area setting unit sets an area in the front of the vehicle extending parallel to the travel direction of the vehicle and having a width with a predefined margin added to both lateral sides of the vehicle as the first contact determination area.

According to the vehicle periphery monitoring device of the third aspect of the present invention, when the object is determined to be a human being, the first contact determination area is set to be an area in the front of the vehicle which extends parallel to the travel direction of the vehicle and has a width with a predefined margin added to both lateral sides of the vehicle. In the area, the contact possibility between the vehicle and the object is high, and in the outside area thereof, the contact possibility between the vehicle and the object is not necessarily high; thereby, when the real spatial position of the object is contained in the first contact determination area, the report that the contact possibility between the vehicle and the object is high can be given out to the driver at an appropriate frequency. Moreover, when the object is a human being, even though the real spatial position of the human being is contained in the outside area of the first contact determination area, the report will not be given out; thereby, the report can be prevented from being given out to the driver at a high frequency in vain. On the other hand, since the second contact determination area is contained in the outside area of the first contact determination area, when the object is a quadruped animal, the report can be given out at an earlier time than the case when the object is a human being. Accordingly, the high contact possibility between the vehicle and the object can be reported at an appropriate time or frequency according to the type of the object.

A fourth aspect of the present invention is dependent on the first aspect of the present invention, wherein the contact determination area setting unit sets an imaging area captured by the imaging device as the second contact determination area.

According to the vehicle periphery monitoring device of the fourth aspect of the present invention, when the object is determined to be a quadruped animal, the second contact determination area is set as an imaging area captured by the imaging device, in other words, the maximum range which can be recognized by the vehicle; therefore, when the real spatial position thereof is contained in the second contact determination area, the report that the contact possibility between the vehicle and the object is high can be given out at an earlier time. On the other hand, when the object is determined to be a human being, the first contact determination area is limited to an area inside the imaging area, even though the real spatial position thereof is contained in the overflowed area overflowing from the first contact determination area, the report will not be given out, thus, the report can be prevented from being given out to the driver at a high frequency in vain. Accordingly, the high contact possibility between the vehicle and the object can be reported at an appropriate time or frequency according to the type of the object.

DETAILED DESCRIPTION OF THE PREFERRED EMBODIMENTS

A vehicle periphery monitoring device of an embodiment according to the present invention will be described hereinafter.

Figure 1:
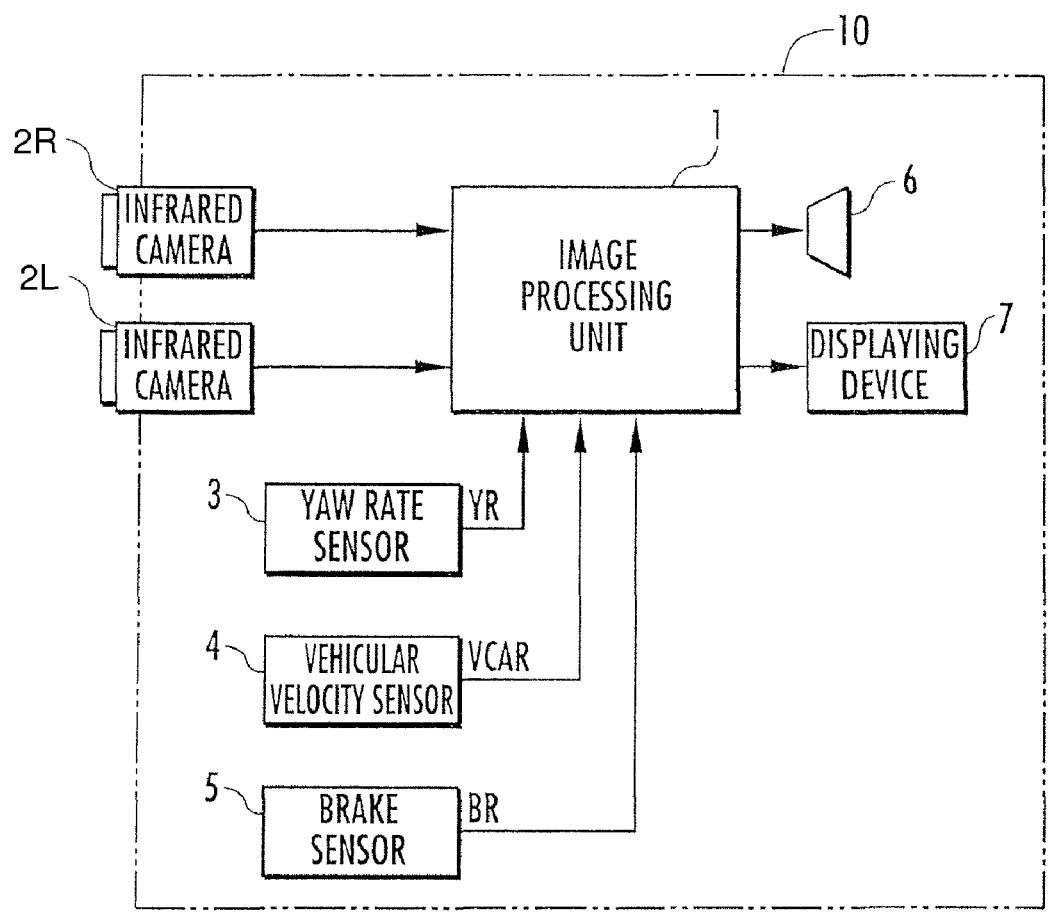
FIG. 1 is a view of an overall configuration of a vehicle periphery monitoring device according to an embodiment of the present invention.
Figure 2:
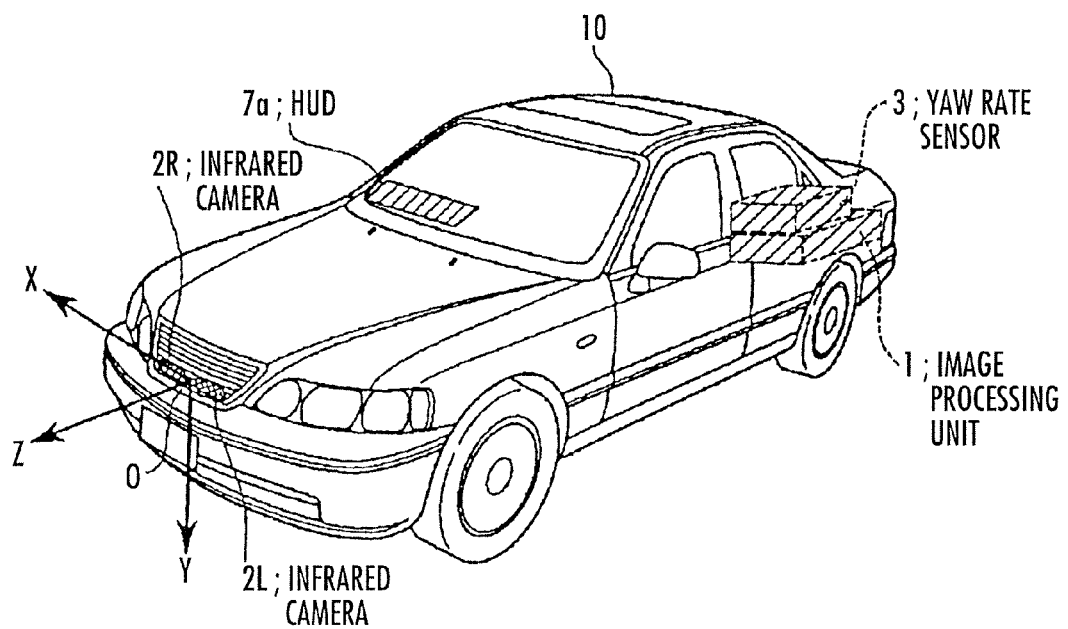
FIG. 2 is a perspective view of a vehicle mounted with the vehicle periphery monitoring device illustrated in FIG. 1.

First, the configuration of the vehicle periphery monitoring device of the present embodiment will be described. The vehicle periphery monitoring device illustrated in FIG. 1 and FIG. 2 is provided with an image processing unit 1. The image processing unit 1 is connected with two infrared cameras (corresponding to imaging devices) 2R and 2L, a yaw rate sensor 3, a vehicular velocity sensor 4, a brake sensor 5, a speaker 6 and a display device 7.

The image processing unit 1 functions as an object extraction unit, an object determination unit and a contact determination setting unit in the present invention. The image processing unit 1 is composed of electronic circuits including an A/D conversion circuit, a micro computer (having a CPU, a RAM, a ROM and the like), an image memory and the like. The analog signals output from the infrared cameras 2R and 2L, the yaw rate sensor 3, the vehicular velocity sensor 4 and the brake sensor 5 are digitalized by the A/D conversion circuit and the digitalized signals are input into the micro computer. On the basis of the input signals, the micro computer detects an object as a human being (a pedestrian, a human being riding on a bicycle), or a quadruped animal (such as a dog, a cat, a deer, a horse and the like) or the like, and executes a process for reporting the presence of the object to the driver via either or both of the speaker 6 and the display device 7 when the object satisfies a condition to be described hereinafter.

Each of the two infrared cameras 2R and 2L photographs an image in front of the vehicle (self vehicle) 10. In order to photograph the front image of the vehicle 10, the two infrared cameras 2R and 2L are disposed at a front portion (at the front grill in the drawing) of the vehicle 10 (refer to FIG. 2). The infrared camera 2R of the right side is disposed closer to the right side rather than to the center point in the width direction of the vehicle 10, and the infrared camera 2R of the left side is disposed closer to the left side rather than to the center point in the width direction of the vehicle 10. The two cameras 2R and 2L are disposed symmetrical with respect to the central line in the width direction of the vehicle 10. The infrared cameras 2R and 2L are fixed in such a way that the optical axes thereof are parallel to each other in the anteroposterior direction of the vehicle 10 and the height from the road surface to the optical axis of one camera is equal to the other. The infrared cameras 2R and 2L have sensitivity in the far infrared region, therefore, have a property of outputting image signals with higher levels (the luminance of the image signals becomes greater) when the temperature of an object to be photographed becomes higher.

As illustrated in FIG. 2, a real spatial coordinate system is defined with the origin O at a front center portion of the vehicle 10, +X axis extending toward the right direction of the vehicle 10, +Y axis extending downward to the vertical direction thereof and +Z axis extending toward the front direction of the vehicle 10.

The yaw rate sensor 3, the vehicular velocity sensor 4 and the brake sensor 5 output signals corresponded to a yaw rate, a travel velocity (vehicular velocity) and braking operations which denote the travel conditions of the vehicle 10, respectively. The speaker 6 outputs report information as voices which can be recognized aurally. The display device 7 displays a captured image acquired by the infrared cameras 2R and 2L or a processed image of the captured image. As the display device 7, a HUD (head-up display) 7a displaying an image on the windshield of the vehicle 10 is adopted. In addition to the HUD 7a, a display built integrally with a meter for displaying the travel conditions such as the vehicular velocity or the like of the vehicle 10, a display disposed in a vehicular navigation apparatus may be used as the display device 7.

Hereinafter, the basic functions of the vehicle periphery monitoring device with the aforementioned configurations will be described. The basic processing contents of the flow chart illustrated in FIG. 3 are identical to those illustrated in FIG. 3 of Japanese Patent Laid-open No. 2001-006096 and FIG. 3 of Japanese Patent Laid-open No. 2007-310705 applied by the present applicants.

Figure 3:
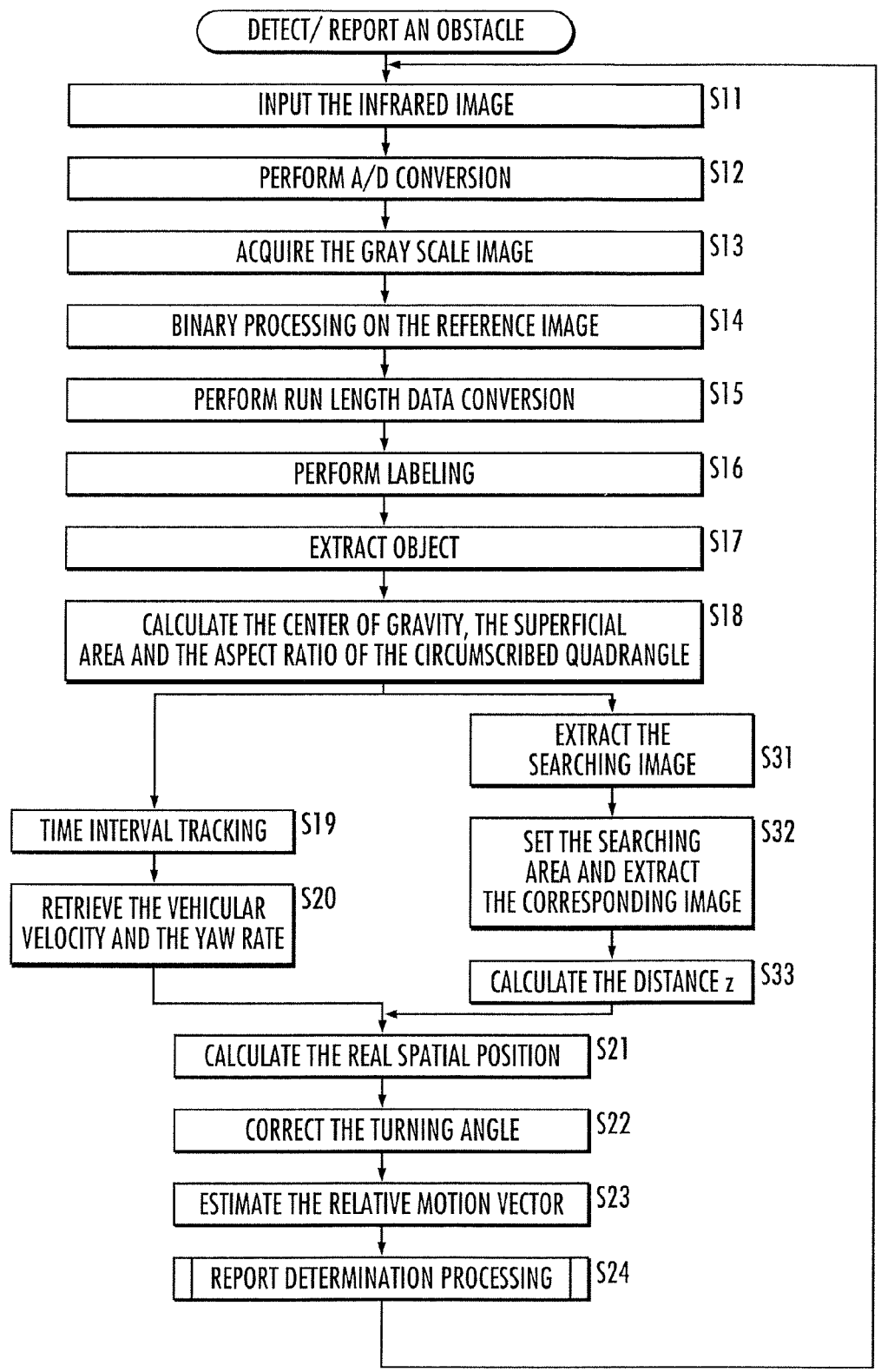
FIG. 3 is a flow chart illustrating a procedure performed by an image processing unit disposed in the vehicle periphery monitoring device illustrated in FIG. 1.

Specifically, at first, the signals from the infrared cameras 2R and 2L are input into the image processing unit 1 (FIG. 3/STEP 11). Thereafter, the input signals are subjected to A/D conversion to generate an infrared image (FIG. 3/STEP 12). Then, a gray scale image is generated from the infrared image (FIG. 3/STEP 13). Subsequently, a binarized image is generated by binarizing a reference image (for example, a gray scale image obtained through the camera 2R at the right side) (FIG. 3/STEP 14).

As described below, an image area corresponding to an object or an image area in which the object is present is extracted from the binarized image as an object area. Specifically, the group of pixels constituting a high luminance area in the binarized image is converted to run length data (FIG. 3/STEP 15).

The lines in a group overlapped in the vertical direction of the reference image are tagged with a label (identifier), respectively (FIG. 3/STEP 16). The image area constituted by the grouped lines is extracted as the object area (FIG. 3/STEP 17). Thereafter, the center of gravity of the object area (position in the reference image), the superficial area and the aspect ratio of the circumscribed quadrangle are calculated (FIG. 3/STEP 18). According to a time interval tracking process performed on the object area, the image processing unit 1 determines whether or not the object corresponding to the object area is identical every arithmetic computation cycle (FIG. 3/STEP 19). The outputs from the vehicular velocity sensor 4 and yaw rate sensor 5 (the detection value of the vehicular velocity and the detection value of the yaw rate) are input into the image processing unit 1 (FIG. 3/STEP 20).

Meanwhile, in parallel to the processing at STEP 19 and STEP 20, the image processing unit 1 performs a processing at STEP 31. First, an area (for example, the area of a quadrangle circumscribed the object) corresponding to each object in the reference image is extract as a searching image (FIG. 3/STEP 31). An image (corresponding image) corresponding to the searching image in the left image is extracted by performing a correlation computation with respect to the searching image (FIG. 3/STEP 32).

Thereafter, a distance (in the anteroposterior direction of the vehicle 10) from the vehicle 10 to the object is calculated (FIG. 3/STEP 33). Then, the real spatial position (X, Y, Z) of each object is calculated (refer to FIG. 3/STEP 21 and FIG. 2). The configuration for performing the processing at STEP 21 by the image processing unit 1 corresponds to a position determination unit of the present invention. Thereafter, the X coordinate values denoting the real spatial position (X, Y, Z) of the object is corrected according to the turning angle data in time series obtained at STEP 20 (FIG. 3/STEP 22).

Subsequently, a relative motion vector of the object with respect to the vehicle 10 is estimated (FIG. 3/STEP 23). Thereafter, a report determination processing is performed (FIG. 3/STEP 24). In the report determination processing, the level of the contact possibility between the vehicle 10 and the object is determined on the basis of the relative motion vector, and the driver is reported with the presence of the object when the contact possibility is determined to be high. The overall operations of the vehicle periphery monitoring device of the present embodiment are described in the above. The configuration for performing the processing from STEP 11 to STEP 18 by the image processing unit 1 corresponds to an object extraction unit of the present invention.

Hereinafter, the report processing which is a major function of the vehicle periphery monitoring device of the present invention will be described.

Figure 4:
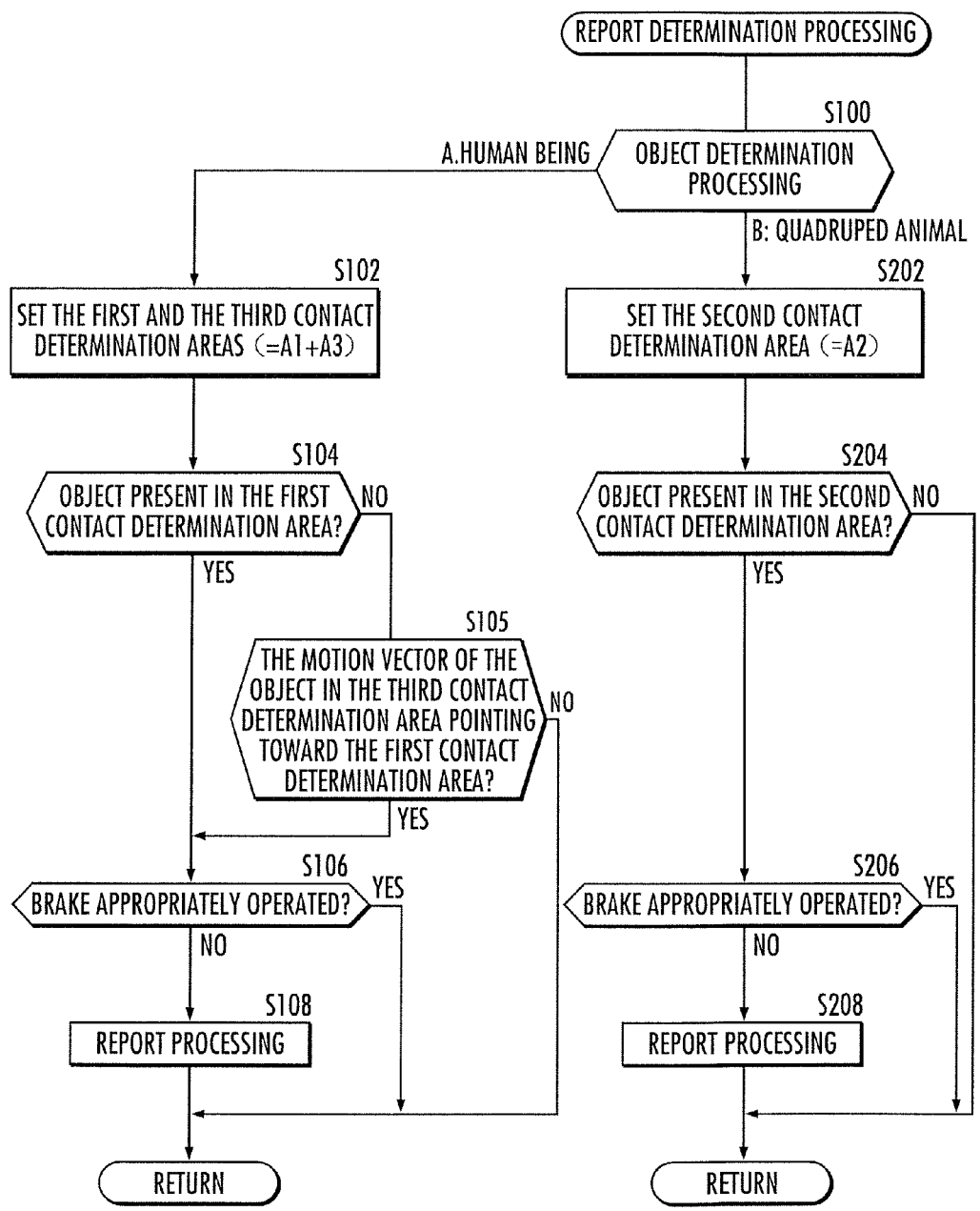
FIG. 4 is a flow chart illustrating a report determination processing in the present embodiment.

First, according to an object determination processing, whether the extracted object is a human being or a quadruped animal is determined (FIG. 4/STEP 100).

Specifically, the type of the object is determined according to the characteristics such as the shape or size, the luminance distribution and the like of the object area in the gray scale image. For example, when the object area is composed of a first high luminance image area (corresponding to the head) and a second high luminance image area which is located at the lower side of the first high luminance image area and has an arrangement relationship identical to the standard arrangement relation of the shoulder, the body, the arms or the legs with respect to the head in the first high luminance image area (corresponding to the shoulder, the body, the arms or the legs), the object corresponding to the object area is determined to be a human being. When the object area is composed of a first high luminance image area (corresponding to the body) and a second high luminance image area which is located at the lateral side or the lower side of the first high luminance image area and is smaller than the first high luminance image area (corresponding to the head or the legs), the object corresponding to the object area is determined to be a quadruped animal such as a deer, a sheep, a dog or a horse. It is also acceptable to determine the type of an object through pattern matching the outline of the object area with the outline of objects preliminarily stored in memory.

Figure 5:
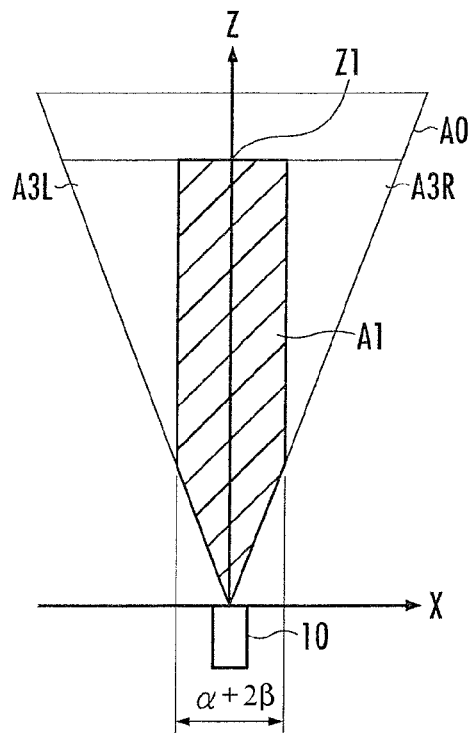
FIG. 5 is a view illustrating a contact determination area captured by an imaging device in the present embodiment.
Figure 5:
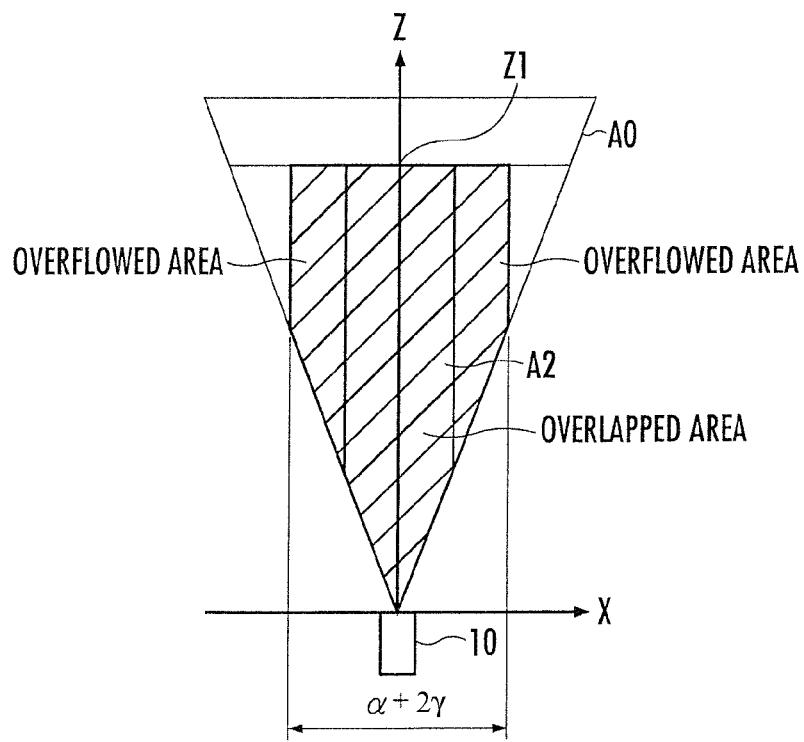

When the object is determined to be a human being (FIG. 4/ STEP 100 . . . A), a first contact determination area A1 and a third contact determination area A3 are set (FIG. 4/ STEP 102). Specifically, as illustrated in FIG. 5(a), an area which is contained in a triangular area A0 which can be captured or monitored by the infrared cameras 2R and 2L, extends parallel to the Z direction and has a width with a first margin β (for example 50 to 100 cm) added to the vehicle width α of the vehicle 10 at both lateral sides thereof in the X direction is set as the first contact determination area A1 (refer to the slashed portion). The depth Z1 of the first contact determination area A1 in the Z direction viewed from the vehicle 10 is defined equal to a distance obtained by multiplying the relative velocity Vs of the vehicle 10 with respect to the object by a time interval T. Moreover, in the triangular area A0 illustrated in FIG. 5(a), areas adjacent to both lateral sides of the first contact determination area is set as a third contact determination areas A3L and A3R, respectively.

Thereafter, whether or not the real spatial position of the object (refer to FIG. 3/STEP 21) is contained in the first contact determination area A1 is determined (FIG. 4/STEP 104). When it is determined that the real spatial position of the object is contained in the first contact determination area A1 (FIG. 4/STEP 104 . . . YES), a report outputting determination processing is performed (FIG. 4/STEP 106). On the other hand, when it is determined that the real spatial position of the object is not contained in the first contact determination area A1 (FIG. 4/STEP 104 . . . NO), whether or not the real spatial position of the object is contained in the third contact determination area A3R or A3L and the motion vector of the object is pointing toward the first contact determination area A1 is determined (FIG. 4/STEP 105).

When the determination result is affirmative (FIG. 4/STEP 105 . . . YES), whether or not the brake is appropriately operated by the driver from the viewpoint of avoiding the contact between the vehicle 10 and the object is determined on the basis of the output signals from the brake sensor 5 (FIG. 4/STEP 106). When it is determined that the brake is not appropriately operated (FIG. 4/STEP 106 . . . NO), the report that the contact possibility between the vehicle and the object is high is given out to the driver (FIG. 4/STEP 108). Specifically, the situation is reported by voices output via the speaker 6. The report may also be given out by highlighting the object on the HUD 7a. It should be noted that the determination processing performed at STEP 106 may be omitted.

On the other hand, when the object is determined to be a quadruped animal (FIG. 4/ STEP 100 . . . B), a second contact determination area A2 is set (FIG. 4/ STEP 202). Specifically, as illustrated in FIG. 5(b), an area which is contained inside the triangular area A0 which can be captured or monitored by the infrared cameras 2R and 2L, extends parallel to the Z direction and has a width with a second margin γ greater than the first margin β added to the vehicle width α of the vehicle 10 at both lateral sides thereof in the X direction is set as the second contact determination area A2 (refer to the slashed portion). The depth Z1 of the second contact determination area A2 in the Z direction viewed from the vehicle 10 is defined equal to a distance obtained by multiplying the relative velocity Vs of the vehicle 10 with respect to the object by the time interval T, similar to the first contact determination area A1. The second contact determination area A2 includes an area entirely overlapped with the first contact determination area A1 and two overflowed areas overflowing with a difference (γ–β) between the second margin γ and the first margin β from both lateral sides of the first contact determination area A1, respectively.

Subsequently, whether or not the real spatial position of the object is contained in the second contact determination area A2 is determined (FIG. 4/STEP 204). When it is determined that the real spatial position of the object is contained in the second contact determination area A2 (FIG. 4/STEP 204 . . . YES), whether or not the brake is appropriately operated by the driver from the viewpoint of avoiding the contact between the vehicle 10 and the object is determined on the basis of the output signals from the brake sensor 5 (FIG. 4/STEP 206). When it is determined that the brake is not appropriately operated (FIG. 4/STEP 206 . . . NO), the report that the contact possibility between the vehicle 10 and the object is high is given out to the driver (FIG. 4/STEP 208).

In the image processing unit 1, the configuration for performing the processing at STEP 100 corresponds to an object determination unit of the present invention, the configuration for performing the processing at STEP 102 and STEP 202 corresponds to a contact determination area setting unit of the present invention, and the configuration for performing the processing at STEP 108 and STEP 208 corresponds to an object report unit of the present invention.

According to the vehicle periphery monitoring device with the abovementioned functions, on condition that the object is determined to be a human being and the real spatial position thereof is contained in the first contact determination area A1, the report that the contact possibility between the vehicle 10 and the object is high is given out (refer to FIG. 4/S100 . . . A, S102 to S108, and FIG. 5(a)). On the other hand, on condition that the object is determined to be a quadruped animal and the real spatial position thereof is contained in the second contact determination area A2, the report that the contact possibility between the vehicle 10 and the object is high is given out (refer to FIGS. 4/S100 . . . B, S202 to S208, and FIG. 5(b)).

The second contact determination area A2 has an overlapped area that overlaps with the first contact determination area A1 and an overflowed area that has at least a part thereof overflowing from the first contact determination area A1 (refer to FIG. 5(a) and FIG. 5(b)). Thereby, when the object is a quadruped animal, even though the real spatial position thereof is not contained in the first contact determination area A1, the report would be given out if the real spatial position of the object is contained in the overflowed area of the second contact determination area A2 which overflows from the first contact determination area A1; therefore, in comparison with the case where the object is a human being, the report can be given out at an earlier time.

On the other hand, when the object is a human being, even though the real spatial position thereof is contained in the overflowed area of the second contact determination area A2 which overflows from the first contact determination area A1, no report would be given out; thereby, the report that the contact possibility between the vehicle 10 and the human being is high can be prevented from being given out at a high frequency in vain. Accordingly, the high contact possibility between the vehicle 10 and the object can be reported at an appropriate time or frequency according to the type of the object.

Figure 6:
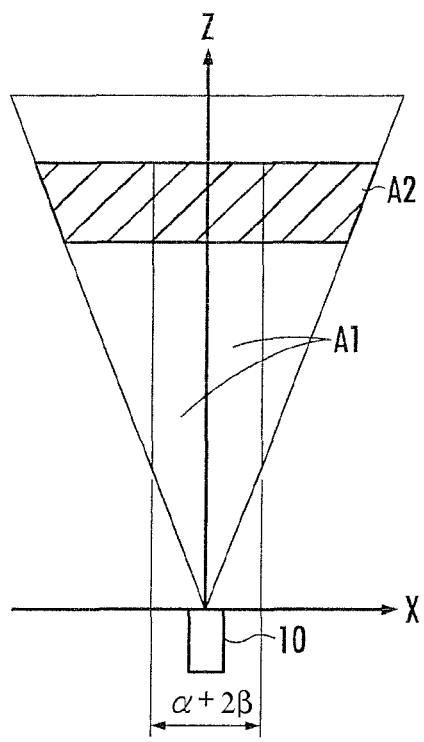
FIG. 6 is a view illustrating a variant example of the contact determination area captured by the imaging device in the present embodiment.
Figure 6:
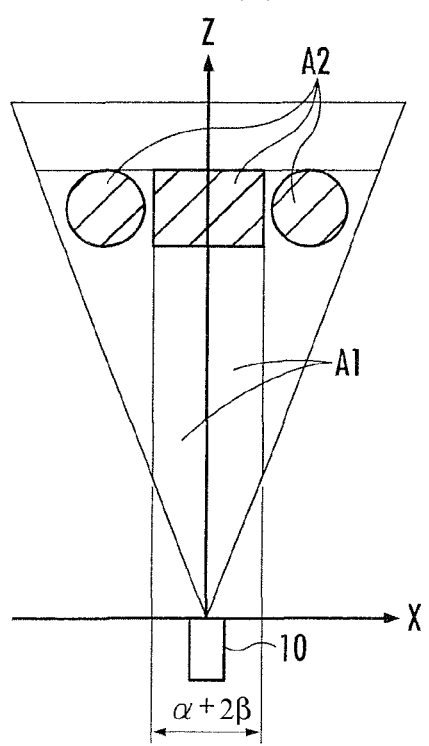

In the abovementioned embodiment, the second contact determination area A2 illustrated in FIG. 5(b) is configured to overlap completely with the first contact determination area A1 illustrated in FIG. 5(a); as another embodiment, it is acceptable that the second contact determination area A2 (slashed portion) is configured to overlap partially with the first contact determination area A1 as illustrated in FIG. 6(a).

In the abovementioned embodiment, the overlapped area that overlaps with the first contact determination area A1 and the overflowed area that overflows from the first contact determination area A1 are adjacent to each other in the second contact determination area A2; however, as illustrated in FIG. 6(b), the overlapped area and the overflowed area may be separate from each other. Moreover, the overflowed area of the second contact determination area A2 which overflows from the first contact determination area A1 may be configured to be at either one side of the overlapped area that overlaps with the first contact determination area or the overflowed areas may be configured to have asymmetrical shapes or arrangements.

In the abovementioned embodiment, an area having a width with the second margin γ (γ>β) added to the vehicle width α of the vehicle 10 at both lateral sides thereof is set as the second contact determination area A2; however, as another embodiment, a combined area of the first contact determination area A1 and the third contact determination areas A3R and A3L may be set as the second contact determination area A2.

Furthermore, an imaging area captured by the infrared cameras 2R and 2L may be set as the second contact determination area AR4. In the present embodiment, a predefined report is given out according to the processing result of the image processing unit 1; it is also acceptable that the vehicle behavior is controlled according to the processing result. Furthermore, it is acceptable to mount in the vehicle 10 one infrared camera only and a radar device or the like for determining the distance between the vehicle 10 and an object.

What is claimed is:

1. A vehicle periphery monitoring device configured to monitor the periphery of a vehicle by using a captured image acquired by an imaging device mounted in the vehicle, comprising:
    an object extraction unit configured to extract an object from the captured image;
    a position determination unit configured to determine the real spatial position of the object extracted by the object extraction unit;
    an object determination unit configured to determine whether the object extracted by the object extraction unit is either a human being or a quadruped animal;
    a contact determination area setting unit configured to set a first contact determination area for determining the contact possibility level between the vehicle and a human being as the object when the object is determined by the object determination unit to be a human being, and to set a second contact determination area for determining the contact possibility level between the vehicle and a quadruped animal as the object when the object is determined by the object determination unit to be a quadruped animal, the second contact determination area having an overlapped area that overlaps with the first contact determination area and an overflowed area that has at least a part thereof overflowing from the first contact determination area; and
    an object report unit configured to report the presence of the object to the driver on a condition that the real spatial position of the human being as the object determined by the position determination unit is contained in the first contact determination area set by the contact determination area setting unit, or on a condition that the real spatial position of the quadruped animal as the object determined by the position determination unit is contained in the second contact determination area set by the contact determination area setting unit.

2. The vehicle periphery monitoring device according to claim 1 is further provided with a motion vector calculation unit configured to calculate a motion vector of the object on the basis of the real spatial position of the object determined by the position determination unit at different times,
    wherein the contact determination area setting unit sets a third contact determination area outside the first contact determination area on a condition that the object is determined by the object determination unit to be a human being,
    the object report unit reports the presence of the human being as the object to the driver on a condition that the real spatial position of the human being as the object determined by the position determination unit is contained in the third contact determination area set by the contact determination area setting unit and the motion vector of the human being as the object calculated by the motion vector calculation unit is pointing toward the first contact determination area.

3. The vehicle periphery monitoring device according to claim 1, wherein
    the contact determination area setting unit sets an area in the front of the vehicle extending parallel to the travel direction of the vehicle and having a width with a predefined margin added to both lateral sides of the vehicle as the first contact determination area.

4. The vehicle periphery monitoring device according to claim 1, wherein
    the contact determination area setting unit sets an imaging area captured by the imaging device as the second contact determination area.

5. The vehicle periphery monitoring device according to claim 2, wherein
    the contact determination area setting unit sets an area in the front of the vehicle extending parallel to the travel direction of the vehicle and having a width with a predefined margin added to both lateral sides of the vehicle as the first contact determination area.

6. The vehicle periphery monitoring device according to claim 2, wherein
    the contact determination area setting unit sets an imaging area captured by the imaging device as the second contact determination area.

7. The vehicle periphery monitoring device according to claim 3, wherein
    the contact determination area setting unit sets an imaging area captured by the imaging device as the second contact determination area.

* * * * *